Jan. 30, 1968 H. E. RIORDAN ETAL 3,366,863
DIRECT CURRENT MOTOR INTEGRATOR
Filed Dec. 29, 1964
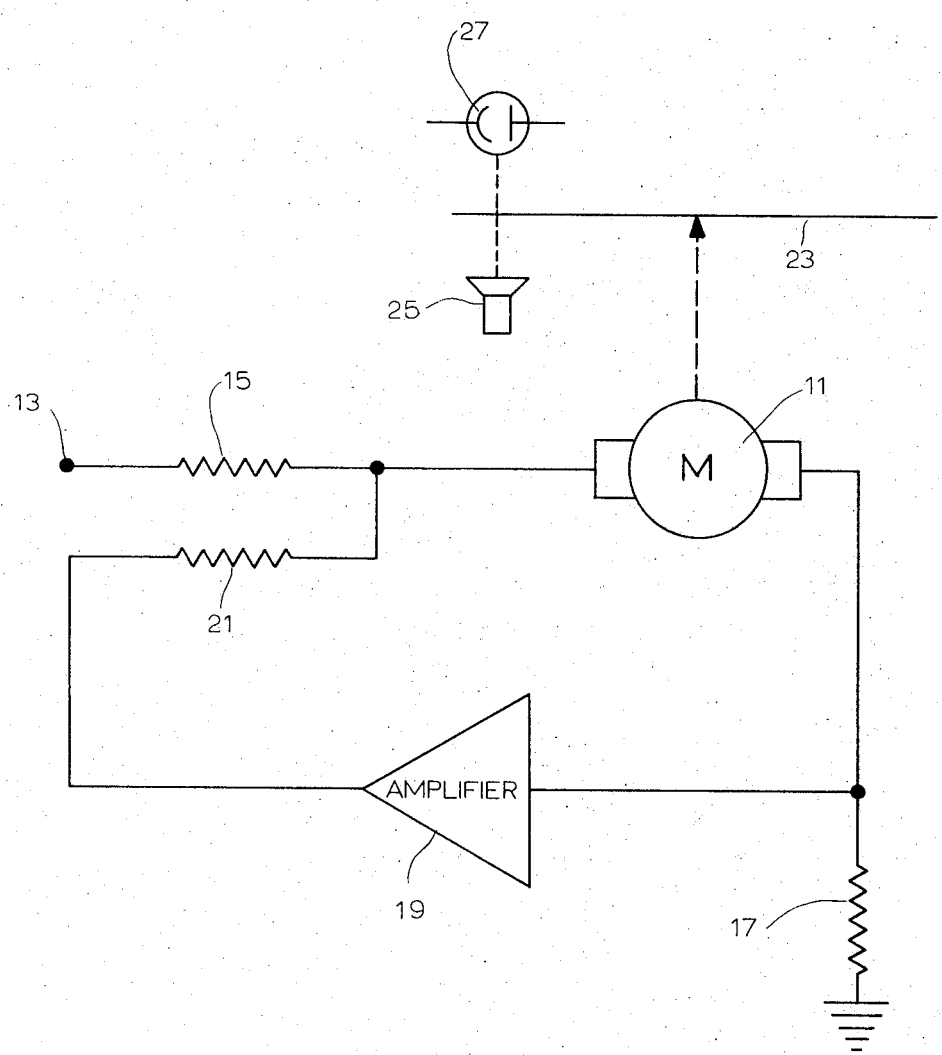
HUGH E. RIORDAN
JOHN C. STILES
  INVENTORS
BY
ATTORNEY

# United States Patent Office 3,366,863
Patented Jan. 30, 1968

3,366,863
DIRECT CURRENT MOTOR INTEGRATOR
Hugh E. Riordan, Wyckoff, and John C. Stiles, Mountain Lakes, N.J., assignors to General Precision Systems Inc., a corporation of Delaware
Filed Dec. 29, 1964, Ser. No. 421,895
3 Claims. (Cl. 318—331)

ABSTRACT OF THE DISCLOSURE

A direct current motor with a fixed field is utilized as an integrator of a signal input by superimposing on the input signal a positive feedback potential proportional to the armature current. The feedback is controlled to just overcome the combination of electrical and mechanical losses whereby the rotation of the armature exactly follows the input signal and therefore is an integration of the input signal.

---

This invention relates to integrators and more particularly to an integrator making use of a permanent magnet DC motor, in which the mechanical losses in the motor are compensated for by positive feedback.

If a DC motor having an iron-free armature and a fixed field were free from friction, the angular velocity of the motor would be precisely proportional to the voltage applied to the armature. Accordingly, the angle through which the armature rotates would be directly proportional to the time integral of the voltage applied to the armature. Moreover, if there were no mechanical losses the current through the armature at equilibrium would be zero because the generated EMF would equal the input signal voltage. Accordingly, in a practical motor the armature current at equilibrium is a measure of the mechanical losses of the motor. In accordance with the present invention, a positive feedback signal voltage proportional to the armature current is applied to the armature to precisely compensate for the mechanical losses so that a motor is provided approximating the behavior of a perfect friction-free motor. Accordingly, a precise integrator is obtained making use of a motor of only mediocre mechanical quality.

Accordingly, an object of the present invention is to provide an improved integrator.

A further object of the present invention is to provide a precise integrator making use of a motor of only mediocre mechanical quality.

A still further object of the present invention is to provide a DC motor approximating the behavior of a perfect friction-free motor.

Further objects and advantages of the present invention will become readily apparent as the following detailed description of the invention unfolds when taken in conjunction with the single figure of the drawing which illustrates a circuit diagram of the system of the present invention.

As shown in the drawing, the reference number 11 designates a DC motor having an iron-free armature and having a fixed magnetic field provided by a permanent magnet. The input signal to be integrated is applied at an input terminal 13, which is connected to one side of the armature of the motor 11 through a resistor 15. The other side of the armature of the motor 11 is connected through ground to a resistor 17. The signal voltage produced across the resistor 17 is amplified by an amplifier 19 and applied through a resistor 21 to the same side of the armature of the motor 11 to which the signal voltage applied at the input terminal 13 is applied. The resistors 15 and 21 have the same values and comprise a summing circuit to add the output signal voltage of the amplifier 19 to the input signal voltage applied at the terminal 13. The signal voltage produced across the resistor 17 and amplified by the amplifier 19 will be proportional to the armature current flowing through the motor 11. The gain of the amplifier 19 is selected so that when its output voltage is combined with the signal voltage applied at the input 13 and applied to the motor 11, it compensates for the mechanical losses of the motor 11. This is possible because the armature current of the motor 11 and thus the current flowing through the resistor 17 will be proportional to these losses. Accordingly the amplified voltage produced by the amplifier 19 can be made to closely compensate for these losses and the motor 11 can be made to approximate the behavior of a friction-free motor. The motor 11 will, therefore, run at a speed precisely proportional to the signal voltage applied at input 13. As a result, the angle through which the armature of the motor 11 rotates will be directly proportional to the time integral of the signal voltage applied to the input terminal 13.

The motor 11 drives a photoelectric tone wheel 23, which is a transparent disc with opaque lines marked at regular intervals about its periphery. Light from a source 25 passes through the disc 23 and is sensed by a photocell 27. The photocell 27 will produce a pulse each time one of the opaque lines on the disc 23 passes through the beam of light passing from the source 25 to the photocell 27 so that the pulses produced by the photocell 27 will be a digital representation of the time integral of the signal voltage applied at the input 13.

The gain which the amplifier 19 is required to have for the output signal voltage of the amplifier 19 to precisely compensate for the mechanical losses of the motor 11 so that the motor has the behavior of a friction-free motor can be determined from the following formula, in which $K_f$ is the gain of the amplifier 19, $R_i$ is the resistance of the resistor 21 and the resistor 15, $R_m$ is the resistance of the armature of the motor 11, and $R_o$ is the resistance of the resistor 17:

$$K_f = \frac{R_i + 2(R_m + R_o)}{R_o} \quad (1)$$

In a practical embodiment of the invention the gain selected for the amplifier 19 should be slightly less than is indicated by the above formula to prevent the system from being unstable. The problem of instability occurs because the values of $R_i$, $R_o$, $R_m$ and $K_f$ will not remain precisely constant and if they should vary so that $K_f$ became greater than the ratio of $$\frac{R_i + 2(R_m + R_o)}{R_o}$$

then the system would become unstable. In a specific embodiment of the invention, the motor 11 is a Mess-motor manufactured by Siemens Corporation of Germany. This motor has an armature resistance of 30 ohms. The resistances of the resistors 15, 21 and 17 are selected to be 1000 ohms. Accordingly the value of $K_f$ from the above equation is determined to be 3060/1000 or 3.06. The value of the gain of the amplifier 19 is selected in this specific embodiment to be 3.0599, which is just below 3.06 so as to prevent the system from being unstable. This specific embodiment of the present invention would achieve an integration accuracy of 0.01% at an input of 1 unit in a system scaled for an input of plus or minus 10 units.

It can be shown mathematically that the system described above and shown in the drawings will precisely compensate for mechanical losses and will have a behavior approximating that of a perfect friction-free motor if the gain of the amplifier 19 is selected in accordance with the formula of Equation 1. If $E_s$ is the input signal voltage applied at terminal 13, $E_f$ is the output voltage of the amplifier 19, and $E_i$ is the resultant voltage at the junction between the resistors 15 and 21, the following equations are true:

$$i = \frac{E_s - E_i}{R_i} + \frac{E_f - E_i}{R_i} \quad (2)$$

$$E_f = K_f R_o \quad (3)$$

$$E_i = i(R_m + R_o) + E_g \quad (4)$$

in which $i$ is the armature current of the motor 11 and $E_g$ is the back EMF generated by the motor 11. The back EMF $E_g$ will be proportional to the speed of the motor and thus can be represented by the following formula:

$$E_g = K_g \dot{\theta} \quad (5)$$

in which $K_g$ is a constant and $\dot{\theta}$ is the time derivative of $\theta$, which is the angular position of the armature of the motor 11. The torque produced by the motor 11 will be proportional to the armature current and thus can be represented by the following formula:

$$T = K_t i \quad (6)$$

in which T represents the torque and $K_t$ is a constant. $K_g$ is related to $K_t$ in accordance with the following equation:

$$K_g = 10^{-7} K_t \quad (7)$$

Substituting the formula for $K_g$ of Equation 7 in Equation 5 and then substituting the resulting formula for $E_g$ in Equation 4 the following equation results:

$$E_i = i(R_m + R_o) + 10^{-7} K_t \dot{\theta} \quad (8)$$

Substituting the formulae for $E_f$ and $E_i$ of Equations 3 and 8 in Equation 2 and solving for $i$ the following equation results:

$$i = \frac{E_s - 2 \times 10^{-7} K_t \dot{\theta}}{R_i + 2(R_m + R_o) - K_f R_o} \quad (9)$$

The equation for motion of a DC fixed-field permanent magnet motor is as follows:

$$J\ddot{\theta} + D\dot{\theta} = K_t i - F \quad (10)$$

in which J is the moment of inertia of the motor, $\ddot{\theta}$ is the angular acceleration of the motor, D is a constant which, when multiplied by the motor speed, provides the component of frictional drag which varies linearly with speed so that the term $D\dot{\theta}$ represents this component of frictional drag, $K_t i$ as shown in Equation 6 is the generated torque, and F is the component of friction which is constant with speed. Substituting the formula of Equation 9 for $i$ in Equation 10, the following equation results:

$$J\ddot{\theta} + D\dot{\theta} = \frac{K_t E_s - 2 \times 10^{-7} K_t^2 \dot{\theta}}{R - K_f R_o} - F \quad (11)$$

in which R has been substituted for the quantity $$R_i + 2(R_m + R_o)$$

for simplification purposes. Using operational notation in Equation 11 and collecting terms, the following equation results:

$$\theta \left\{ JS^2 + S \left[ D + \frac{2 \times 10^{-7} K_t^2}{R - K_f R_o} \right] \right\} = \frac{K_t E_s}{R - K_f R_o} - F \quad (12)$$

If Formula 12 is rearranged, the following formula results:

$$\theta = \frac{1}{S} \left\{ \frac{\frac{E_s K_t}{[D(R - K_f R_o) + 2 \times 10^{-7} K_t^2]} - \frac{F(R - K_f R_o)}{[D(R - K_f R_o) + 2 \times 10^{-7} K_t^2]}}{(\tau S + 1)} \right\} \quad (13)$$

in which $\tau$ represents the following formula:

$$\tau = \frac{J(R - K_f R_o)}{[D(R - K_f R_o) + 2 \times 10^{-7} K_t^2]} \quad (14)$$

If the gain of the amplifier 19 is selected in accordance with the formula in Equation 1 then R will equal $K_f R_o$ and Equation 13 will reduce down to the following:

$$\theta = \frac{1}{S} \left[ \frac{5 \times 10^6 E_s}{K_t} \right] \quad (15)$$

Thus $\theta$ is proportional to the integral of $E_s$ and accordingly the system of the invention is a perfect integrator providing that $K_f$ is selected in accordance with Equation 11. As pointed out above the stability of the values of the resistances and the gain of the amplifier 19 prevents perfect satisfaction of Equation 1 and because of these stability restrictions the gain of the amplifier 19 must actually be smaller than the ideal value by a sufficient amount to ensure that the quantity $R - K_f R_o$ never becomes negative.

The system described above will provide an integrator which is highly accurate even though the mechanical quality of the motor used in the integrator is only mediocre. The above description is of a preferred embodiment of the invention and many modifications may be made thereto without departing from the spirit and scope of the invention, which is defined in the appended claims.

What is claimed is:

1. An integrator comprising a direct current motor having a fixed field, a summing circuit having a first input adapted to receive the signal potential to be integrated and a second input, said summing circuit being connected to apply its output signal potential to the armature of said motor, feedback means to apply a potential proportional to the armature current flowing through said motor to the second input of said summing circuit, said summing circuit comprising a first resistor connected between said first input and one side of the armature of said motor and a second resistor equal to said first resistor connected between said second input and said one side of the armature of said motor, said feed-back means comprising a third resistor connected in series with the armature of said motor so that substantially all of the armature current of said motor passes through said third resistor and an amplifier connected to amplify the signal potential produced across said third resistor and connected to apply the amplified signal potential to said second input of said summing circuit.

2. An integrator as recited in claim 1 wherein the gain of said amplifier is approximately equal to the ratio of $$\frac{R_i + 2(R_m + R_o)}{R_o}$$

in which $R_i$ is the resistance of said first and second resistors, $R_m$ is the resistance of the armature of said motor, and $R_o$ is the resistance of said third resistor.

3. An integrator as recited in claim 2 wherein the gain of said amplifier is selected to be just less than said ratio.

References Cited

UNITED STATES PATENTS

| | | | |
|---|---|---|---|
| 3,134,065 | 5/1964 | Minarik | 318—430 X |
| 3,295,040 | 12/1966 | Schieman | 318—332 X |
| 2,814,012 | 11/1957 | Swanson | 318—331 |
| 3,027,505 | 3/1962 | Auld | 318—331 |
| 3,196,263 | 7/1965 | Marvin | 235—183 |
| 3,251,982 | 5/1966 | Kemmer et al. | 235—150.2 |

OTHER REFERENCES

Del Toro, V., and Parker, S., Principles of Control Systems Engineering, McGraw-Hill Co., New York, N.Y., 1960, copy in Group 210, pp. 214–218 relied upon.

ORIS L. RADER, *Primary Examiner.*

BENJAMIN DOBECK, *Examiner.*

J. C. BERENZWEIG, J. J. BAKER, *Assistant Examiners.*